United States Patent [19]

Bissett

[11] 4,260,036
[45] Apr. 7, 1981

[54] POWERED SKI

[76] Inventor: Fred L. Bissett, 1300 Florence St., Aurora, Colo. 80010

[21] Appl. No.: 951,443

[22] Filed: Oct. 13, 1978

Related U.S. Application Data

[63] Continuation-in-part of Ser. No. 887,789, Mar. 17, 1978, Pat. No. 4,193,609.

[51] Int. Cl.³ ............... B62B 13/08; B62D 57/04
[52] U.S. Cl. ................... 180/182; 180/7 J; 180/7 P; 280/12 KL; 280/21 R
[58] Field of Search .......... 180/182, 183, 7 J, 7 P, 180/181; 244/66, 51; 280/21 R, 16, 21 A, 12 K, 12 KL

[56] References Cited

U.S. PATENT DOCUMENTS

| | | | |
|---|---|---|---|
| 1,146,210 | 7/1915 | Steen | 180/182 |
| 1,151,176 | 8/1915 | Grandinetti | 280/12.1 |
| 1,809,295 | 3/1929 | Gundersen | 280/16 |
| 2,384,296 | 9/1945 | Gluhareff | 244/66 |
| 2,456,440 | 12/1948 | Morill | 280/1 G |
| 2,582,858 | 1/1952 | Capiak | 180/12 |
| 3,044,566 | 7/1962 | Mayr | 180/7 J |
| 3,325,179 | 6/1967 | Bissett | 280/12 K |
| 3,734,230 | 5/1973 | Tanaka | 180/182 |
| 3,819,226 | 6/1974 | Sykora | 180/182 |
| 3,861,492 | 1/1975 | Jensen | 180/182 |
| 3,893,527 | 7/1975 | Walker | 280/7.12 |
| 4,193,609 | 3/1980 | Bissett | 280/12 K |

FOREIGN PATENT DOCUMENTS 835558 4/1952 Fed. Rep. of Germany .......... 180/1 G

Primary Examiner—John J. Love
Assistant Examiner—Randall A. Schrecengost
Attorney, Agent, or Firm—Saidman & Sterne

[57] ABSTRACT

An improved ski device which incorporates a power unit for providing forward thrust and which is capable of operation over water, snow, ice, artificial surfaces, or the like. In one embodiment, the unit utilizes an upright chassis which is articulated to a single runner and has a seat with handles that preferably include control and brake means. The power unit may be mounted in the chassis or rearwardly of the seat on a framework. The framework may be made adjustable so as to permit the angle of thrust imparted by the power unit to be varied. In an alternative embodiment, steering means may be provided in the form of a separate, steering ski pivotally mounted to a steering column and handle bar assembly which extends from the forward portion of the chassis. Outrigger pontoons or skis may be provided as the intended use dictates.

44 Claims, 17 Drawing Figures

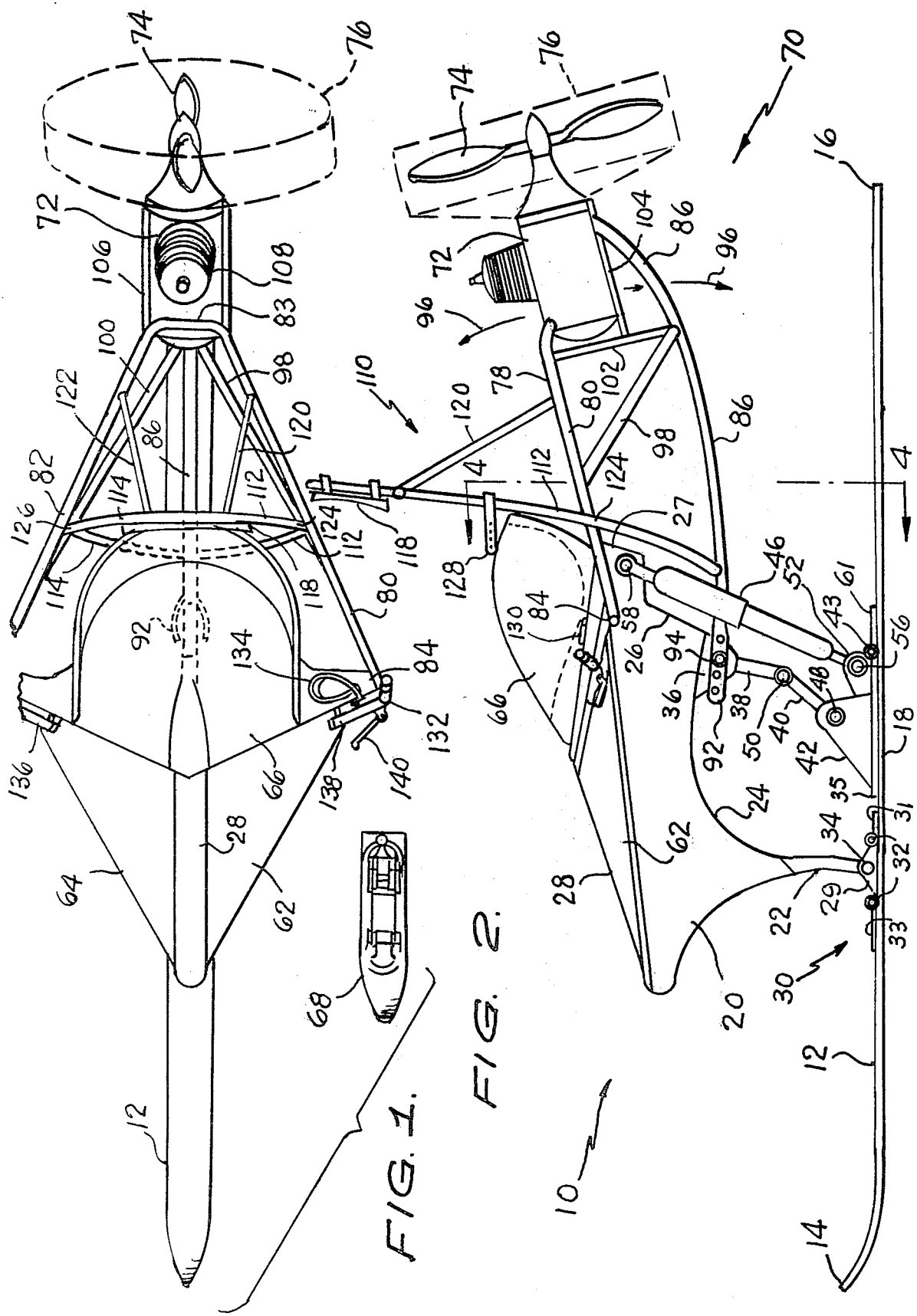

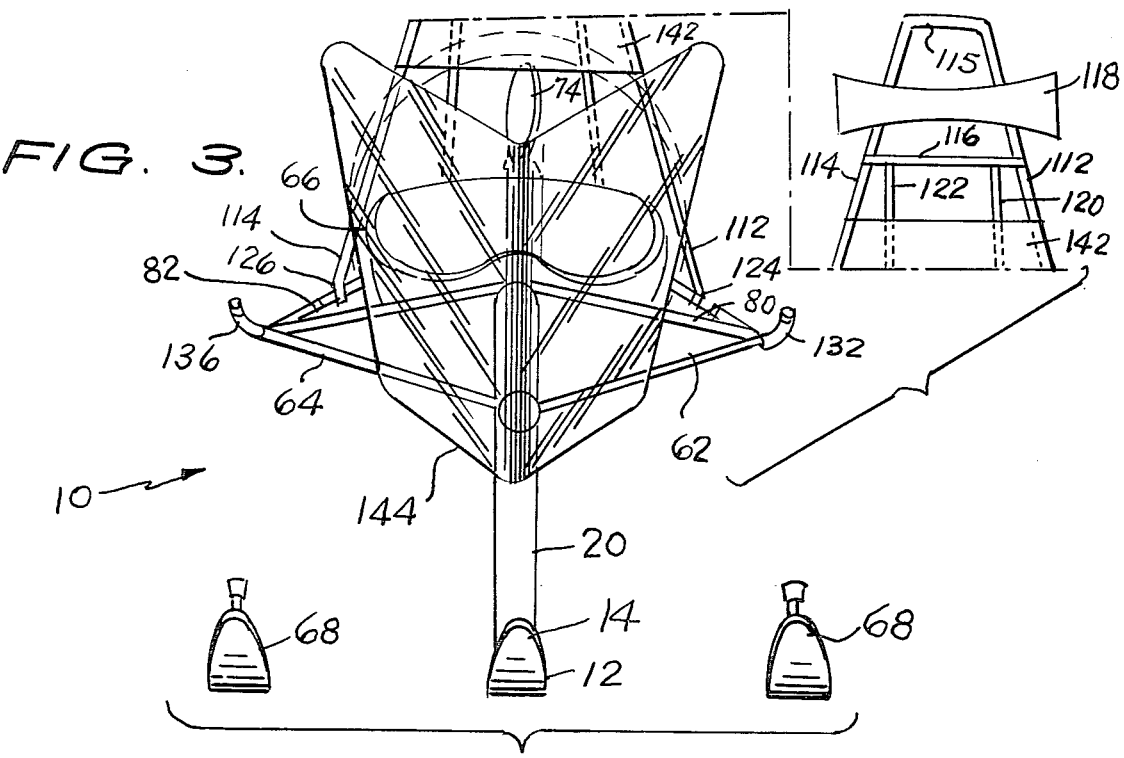
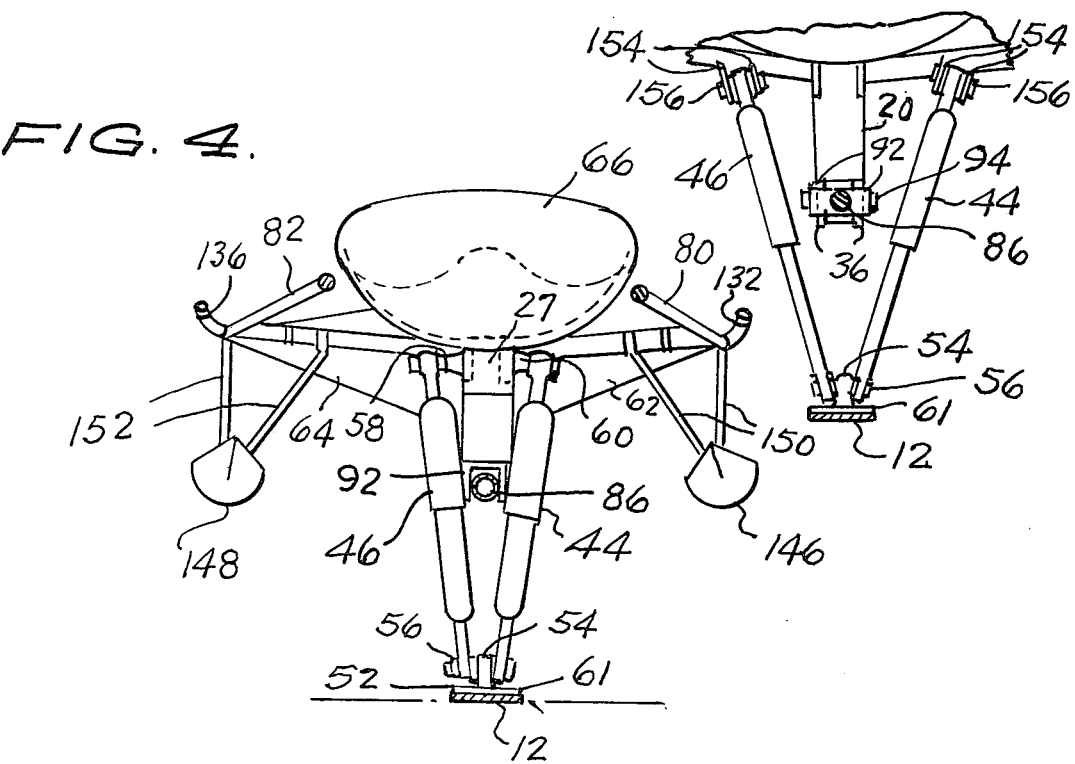

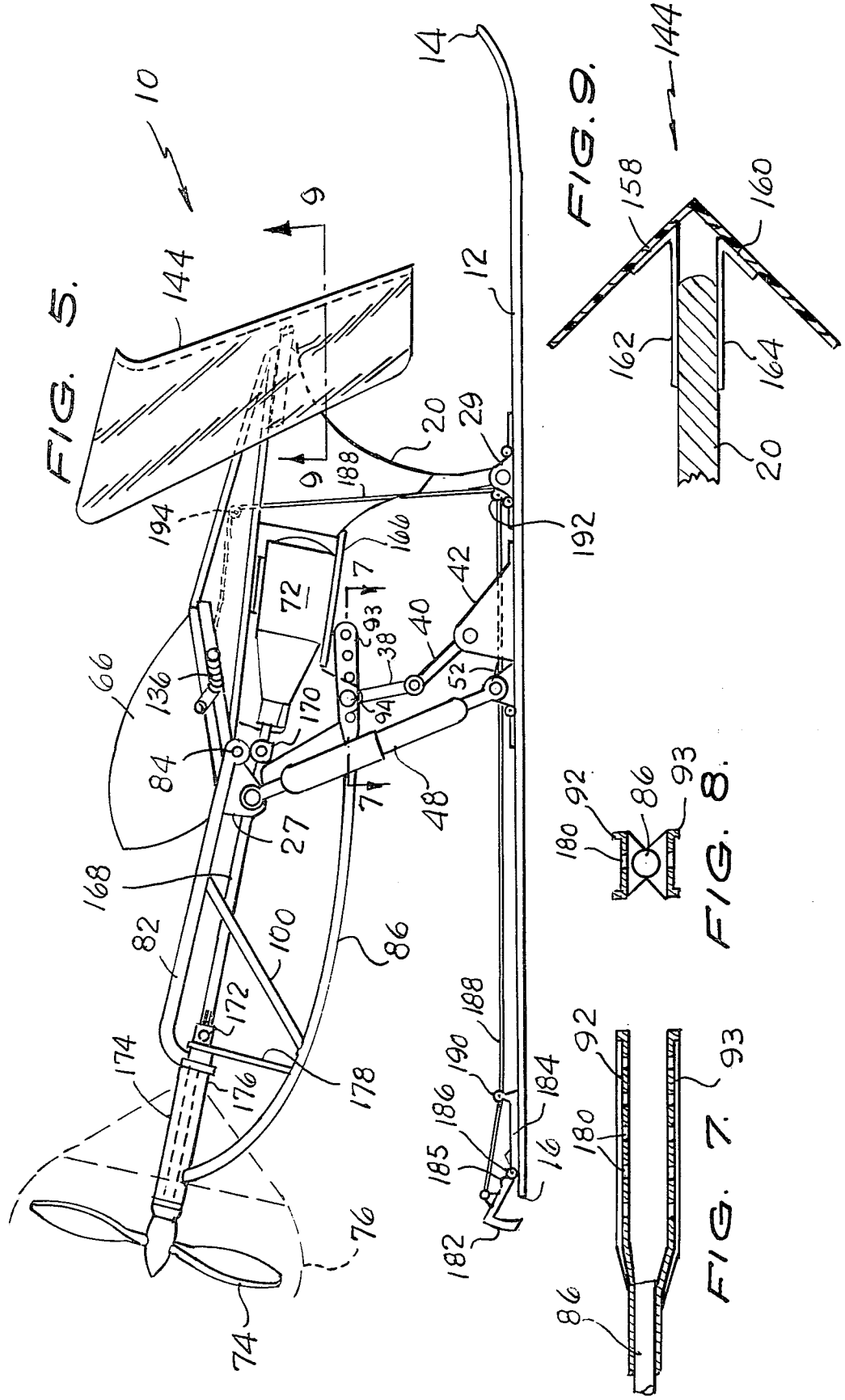

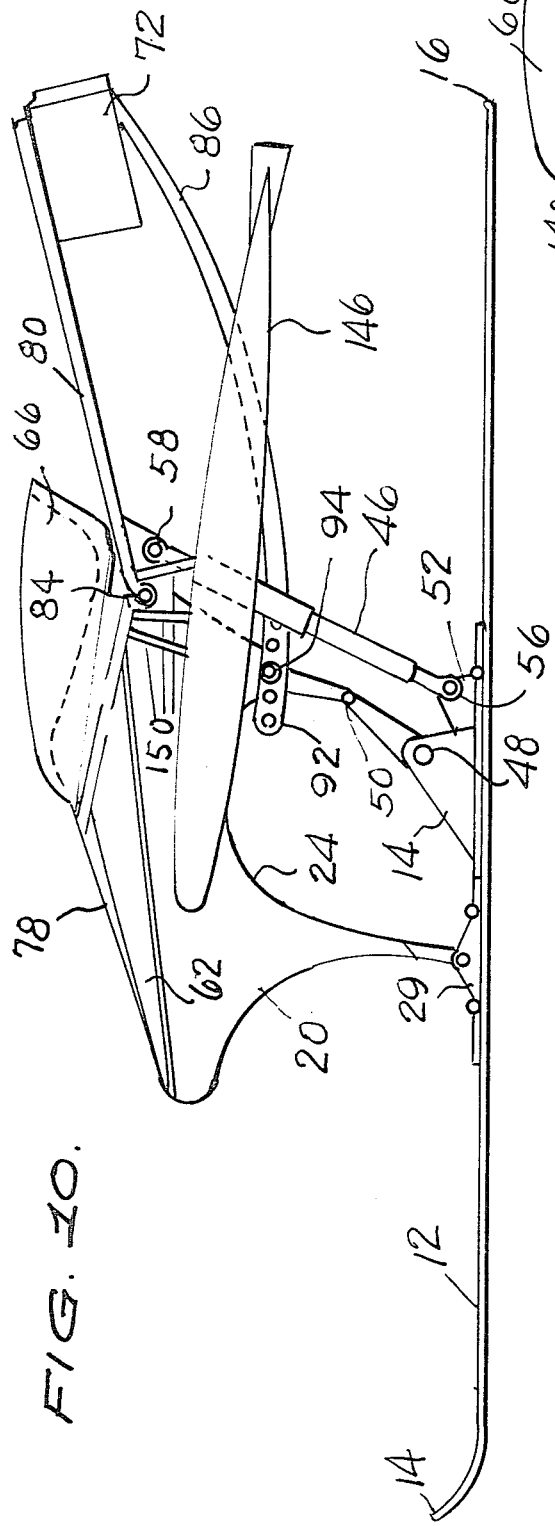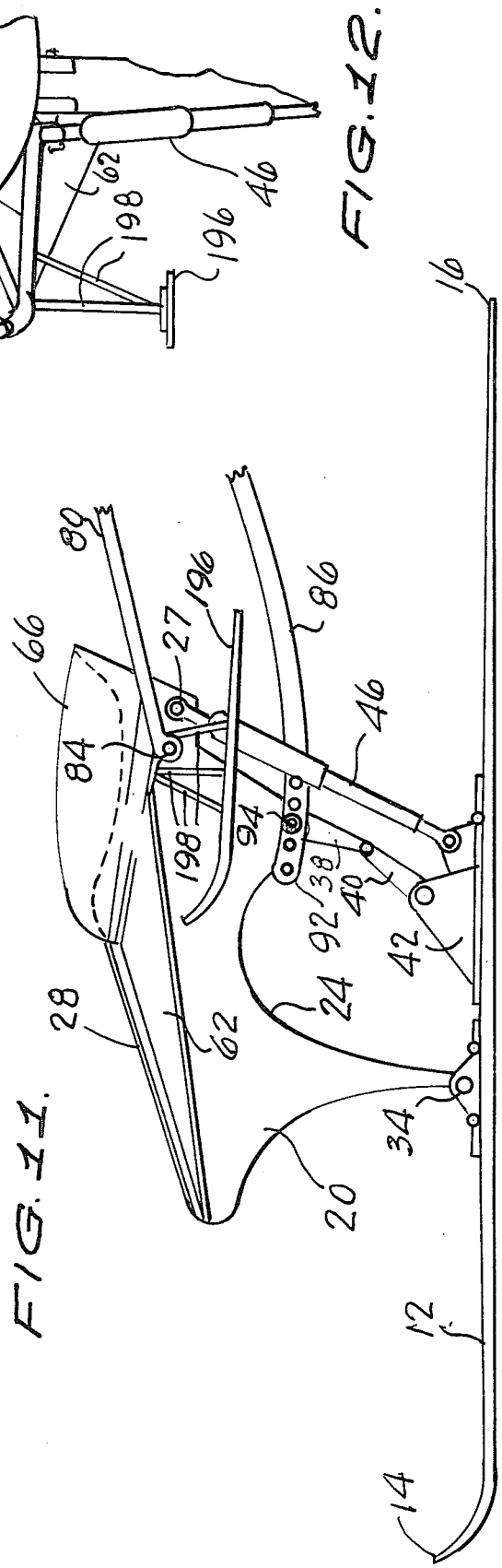

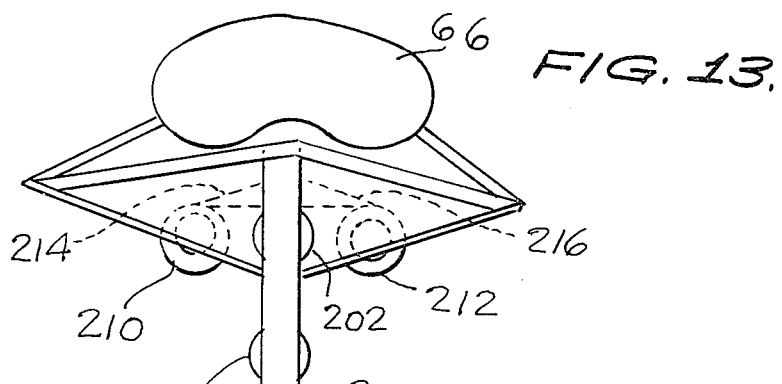
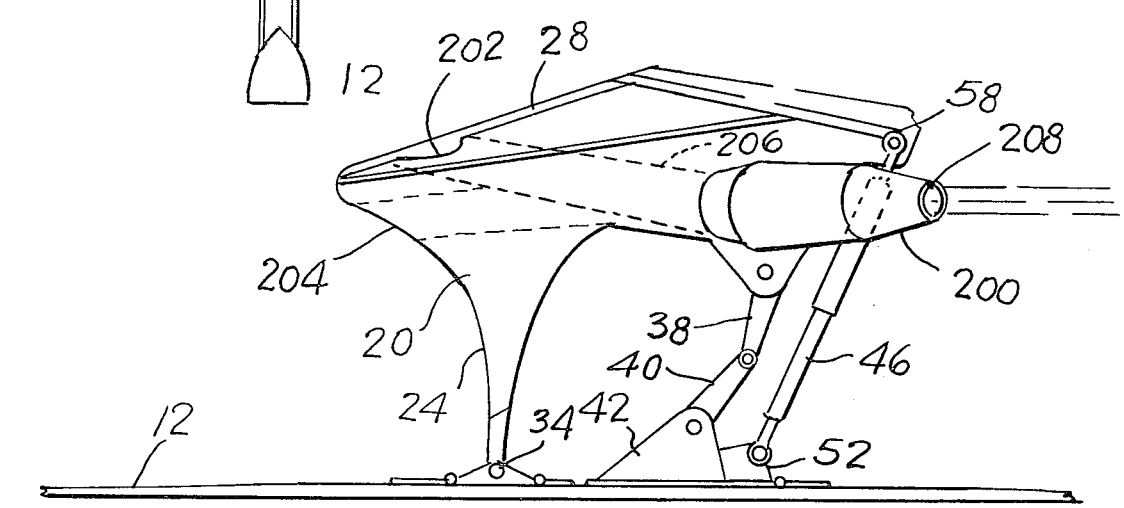
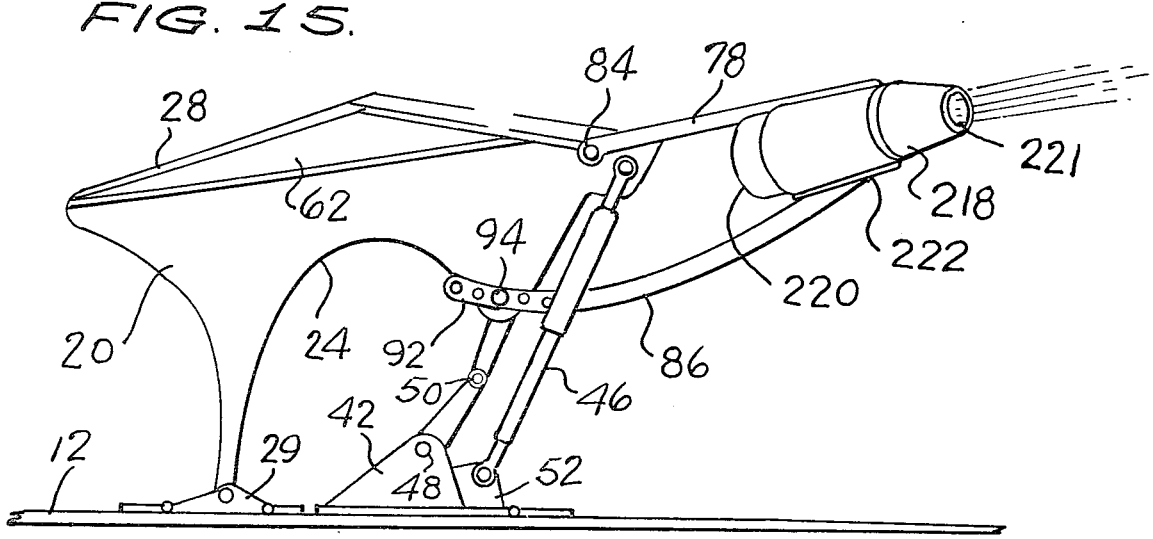

POWERED SKI

CROSS REFERENCE TO RELATED APPLICATION

The present application is a continuation-in-part of my prior U.S. application Ser. No. 887,789, filed Mar. 17, 1978 now U.S. Pat. No. 4,193,609.

BACKGROUND OF THE INVENTION

1. Field of the Invention

The present invention is related to ski devices or assemblies and, more particularly, is directed towards a skiing unit having a central runner means from which extends upwardly a vertical chassis and a seat for an operator.

2. Description of the Prior Art

My prior U.S. Pat. No. 3,325,179 teaches a ski device which has a single runner and a shock-absorbing seat structure and which is capable of operation on snow or other suitable surfaces, including water.

I have recently improved the basic design of my ski device, which improvements are set forth in the parent application referred to hereinabove (Ser. No. 887,789).

I have also come to realize the desirability of adding some type of forward thrust power unit to my ski device, in an attempt to attract the more adventuresome individual in the market. It is toward this end that the present invention is advanced.

Although I am aware of several prior patents which teach various motorized vehicles, none, to my knowledge, has been successfully marketed since they all suffer from one or more design disadvantages.

Those prior art patents of which I am aware include: U.S. Pat. Nos. 1,151,176; 2,456,440; 2,582,858; 3,044,566; and 3,861,492; and German Pat. No. 835,558.

OBJECTS AND SUMMARY OF THE INVENTION

It is a primary object of the present invention to provide a new and improved ski device which incorporates a forward thrust power unit for propelling the ski device.

Another object of the present invention is to provide a novel and unique power ski which incorporates a forward thrust unit whose angle of thrust is variable and easily adjustable.

An additional object of the present invention is to provide a new and improved ski device which incorporates an adjustable forward thrust power unit whose controls are within easy reach of an operator and rider.

A still further object of the present invention is to provide a powered ski unit which incorporates several safety features and structural advantages over prior art units of a similar nature.

A still additional object of the present invention is to provide a novel and unique ski device which incorporates forward thrusting means and which is strong, durable, and easily assembled and disassembled for storage, shipping or transport.

A further object of the present invention is to provide an improved powered ski device which incorporates independently articulated steering means.

The foregoing and other objects are attained in accordance with one aspect of the present invention through the provision of a ski device which comprises elongated runner means, seating means pivotally mounted at its forward end to the runner means, anti-sway means pivotally mounted between the seating means and the runner means, shock-absorbing means pivotally mounted between and extending downwardly and forwardly from the rear portion of the seating means to the runner, and power-operated means connected to the seating means for propelling the device forwardly.

More particularly, the seating means comprises a vertically oriented chassis and a seat mounted to the top of the rear portion thereof. The present invention further preferably includes frame means connected between the chassis and the power-operated means for supporting the latter. The frame means further preferably includes means for adjusting the angle of thrust imparted by the power-operated means by changing the angle of inclination of the latter with respect to the horizontal.

In accordance with more specific aspects of the present invention, the frame means comprises an upper frame member including two tubular arms each pivotally connected at their forward ends to the chassis, and a lower tubular frame member which terminates in means for adjustably connecting same to the chassis. More specifically, the means for adjustably connecting the lower frame member to the chassis comprises a yoke assembly extending from the end of the lower tubular frame member and including a pair of parallel bracket members having apertures formed along the length thereof for selective attachment to the chassis. The upper and lower frame members extend rearwardly from the chassis and terminate in a motor mount assembly for supporting the power-operated means. In one embodiment, the power-operated means comprises a motor driven propeller, while in an alternate embodiment the power-operated means comprises a jet engine.

In accordance with another form of the present invention, the power-operated means may comprise a propeller, and a motor may be mounted in the chassis which is connected to the propeller via a drive shaft extending rearwardly from the motor. In this embodiment, the upper and lower frame members extend rearwardly from the chassis and terminate in a propeller mount assembly for supporting the propeller. The propeller mount assembly more specifically comprises a cylindrical housing having bearings on the inside thereof through which the drive shaft extends, and a mounting plate connected to the lower frame member for supporting the housing. At least one universal joint is preferably provided to which the shaft is connected adjacent the motor for permitting the thrust thereof to be angularly adjusted.

In accordance with other aspects of the present invention, a pair of handle means are positioned one on each side of the seat of the ski device. One of the handle means preferably includes throttle means for controlling the speed of the power-operated means, while one of the handle means may also include means for actuating means for braking the device. The braking means in a preferred embodiment comprise a brake claw mounted to the rear end of the runner means, and cable means for connecting the brake claw to the means for actuating same on one of the handles. More specifically, the brake claw comprises an L-shaped member pivotally mounted to the rear end of the runner. Spring means normally bias the claw downwardly into engagement with the surface over which the runner means is positioned. The means for actuating the L-shaped member comprises a lever which, when grasped by a user acts to oppose the bias of the spring means by drawing the brake claw out of engagement with the surface.

In accordance with other aspects of the present invention, switch means may be positioned in one of the handle means for automatically cutting off the power-operated means as a safety feature. Further, a windshield may be attached to the forward portion of the chassis, and a roll-bar assembly may be connected to and extend upwardly from the frame means. More specifically, the roll-bar assembly may include a pair of vertical support arms connected by a crossbar at the top ends thereof and extending downwardly and outwardly to each of the tubular arms and then inwardly and downwardly to the lower frame member. An adjustable head rest may be positioned between the upper portions of the pair of vertical support arms of the roll-bar assembly, while a back rest may be mounted between the vertical support arms below the head rest.

The present invention may also include a pair of pontoons connected respectively so as to extend downwardly from the pair of handle means for use over water, while a pair of outrigger skis may be substituted for the pontoons for use over snow or ice.

In an alternate embodiment of the present invention, the power-operated means may be mounted within the chassis and may comprise at least one jet engine. Intake port means in this embodiment are positioned in the forward portion of the chassis and are connected to the jet engine via an air conduit.

The runner means comprises a single ski pivotally connected to the chassis at the forward and rear end thereof. Alternatively, the runner means may comprise a main ski connected to the chassis via the anti-sway means, and a steering ski positioned forwardly of the main ski and connected to the chassis at the forward end thereof. In this embodiment, means for turning the steering ski are coupled to the forward end of the chassis in the form of a steering column pivotally coupled to the chassis, shock-absorber means coupled to the steering column, and means for pivotally coupling the lower end of the shock-absorber means to the steering ski. A handlebar is preferably connected to the steering column so as to rotate same upon actuation by a rider. The shock-absorber means and steering column assembly are preferably of the twin-fork variety, and the forward end of the chassis includes a pivot bushing and pivot pin for effecting a pivotal connection to the twin-fork. A stabilizer means is preferably connected between the pivot bushing and the anti-sway means, and preferably comprises a curved stabilizer bar pivotally coupled both to the pivot bushing and a pivotal connection between the anti-sway means and the main ski. Foot rest means may be provided on the stabilizer means as an alternative to separately provided outrigger skis.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a top view of a first preferred embodiment of the present invention;

FIG. 2 is a side view in elevation of the preferred embodiment illustrated in FIG. 1;

FIG. 3 is a front view of the first preferred embodiment illustrated in FIG. 2;

FIG. 4 is a sectional view of the preferred embodiment illustrated in FIG. 2 and taken along line 4—4 thereof;

FIG. 5 is a side view in elevation of an alternate embodiment of the present invention;

FIG. 6 is a view similar to FIG. 4 but illustrating an alternate shock-absorber mounting of this embodiment;

FIG. 7 is a sectional view of the second embodiment illustrated in FIG. 5 and taken along line 7—7 thereof;

FIG. 8 is an end view of the structure illustrated in FIG. 7;

FIG. 9 is a sectional view of the windscreen structure illustrated in FIG. 5 and taken along line 9—9 thereof;

FIG. 10 is a side view in elevation of the optional embodiment illustrated in FIG. 4;

FIG. 11 is a view similar to FIG. 10, partially broken, but illustrating an alternate option of the present invention;

FIG. 12 is an enlarged, rear view, partially broken, of the embodiment illustrated in FIG. 11;

FIG. 13 is a front view of a still further alternate embodiment of the present invention;

FIG. 14 is a side view and elevation of yet another alternate embodiment of the present invention;

FIG. 15 is a side view in elevation of a still further alternate embodiment of the present invention;

DETAILED DESCRIPTION OF THE PREFERRED EMBODIMENTS

Figure 16:
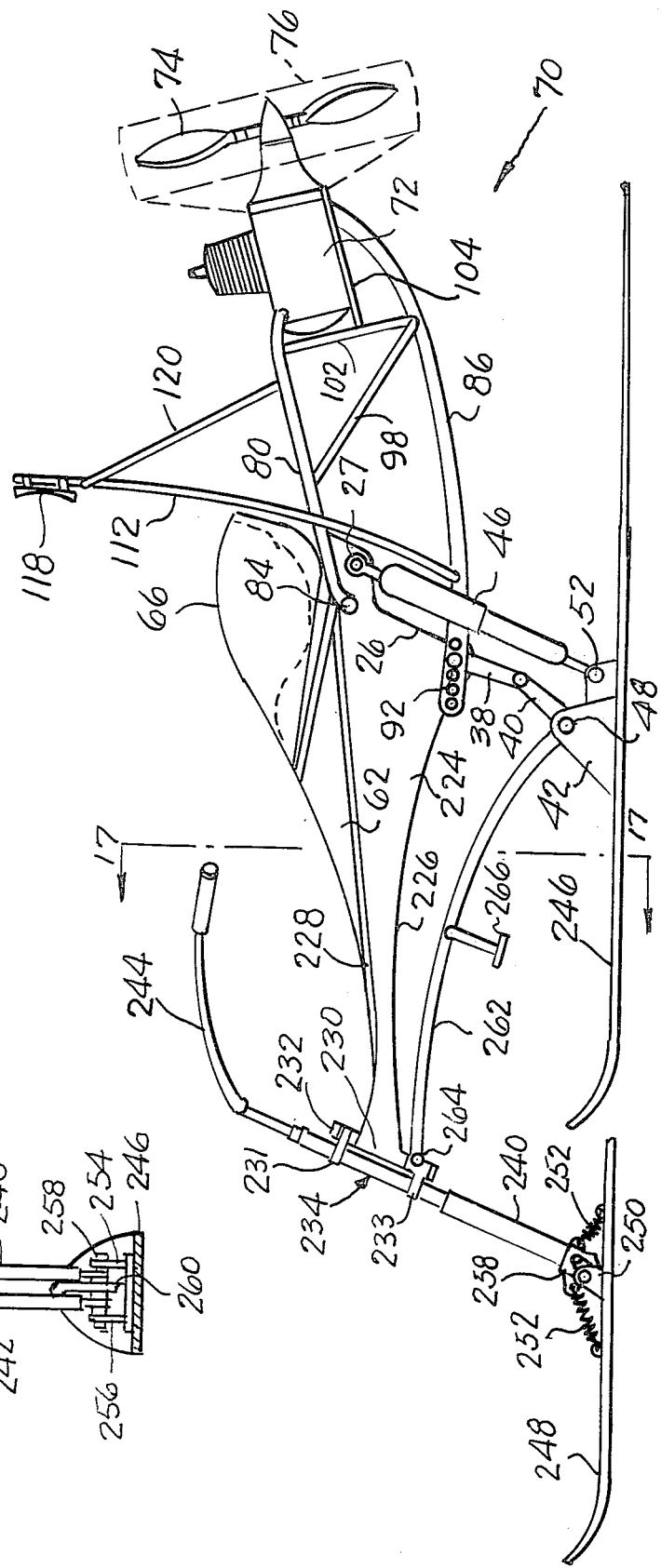
FIG. 16 is a side view and elevation of yet another alternate embodiment of the present invention.

The ski device of the present invention is indicated generally by reference numeral 10 and, as more fully described in parent application 887,789 filed Mar. 17, 1978, comprises an efficient, controllable and comfortable device which includes a seat structure which is articulated to runner means for tilting forwardly and rearwardly, as well as upwardly, relative to the runner, in a vertical plane, in response to variations in the contours of the medium over which the ski device 10 is operated, the movement of the seat structure being snubbed and controlled by shock-absorbing means connected between the seat assembly and the runner means. The structure, function and interconnections of the components which comprise the basic ski device 10 of the present invention are clearly set forth in my parent application referred to hereinabove, the disclosure of which is specifically incorporated herein by reference.

Referring now to the drawings, wherein like reference numerals represent identical or corresponding parts throughout the several views, and more particularly to FIGS. 1-4 thereof, the ski device 10 of the present invention is seen to generally include a runner 12 having an upwardly curved front end 14 and a rear end 16. An upright chassis 20 is mounted to the central section 18 of runner 12. Chassis 20 includes a curved front edge 22 which is pivotally attached as at 34 to a hinge bracket 29. The chassis 20 further includes a central, rearwardly curved lower edge 24 which terminates in a rearwardly positioned and downwardly extending bracket 36. A relatively stright rear edge 26 extends upwardly from the bracket 36 and then outwardly to form a rearmost edge or protrusion 27. The chassis 20 also includes an upper edge 28 which extends from the forward most tip of the ski device 10 rearwardly and upwardly to a bucket-style seat 66.

The front edge 22 is pivotally mounted to the runner 12 by a mounting bracket which is indicated generally by reference numeral 30. A pair of hinges 31 and 33 form pivots 32 to allow the runner 12 to flex, as explained more fully in my parent application.

The ski device 10 also includes an anti-sway linkage which includes an upper arm 38 and a lower arm 40 which are pivotally connected by pin 50. The lower arm 40 is connected via pivot 48 to a lower bracket 42, while the upper arm 38 is pivotally mounted as at 94 to bracket 36. The structure and function of the anti-sway linkage is described in my parent application in greater detail.

The ski device 10 also includes either a single shock absorber, as described in detail in my parent application, or a dual shock absorber structure for the seat 66. Illustrated in FIGS. 2 and 4 is the dual shock absorber structure which includes a pair of shock absorbers 44 and 46 which are pivotally mounted between protrusion 27 and the runner 12. More particularly, a hinge structure 61 couples the brackets 42 and 52 to the ski 12 and includes a center stud 54 having a pin 56 which extends through the lower ends of shock absorbers 46 and 44. The upper ends of shock absorbers 46 and 44 are coupled to a pair of support shafts 58 and 60 which are fastened to protrusion 27.

The ski device 10 of the present invention also includes a pair of triangular shaped snow or water fenders 62 and 64 which are pivotally mounted to the center chassis 20 in a manner described in greater detail in my parent application, as is the structure and connection of bucket seat 66. A pair of optional outrigger foot skis 68 may also be provided for a wearer to assist in steering and guidance of the ski device 10 of the present invention.

The power unit of the present invention is indicated generally by reference numeral 70. In the embodiment of FIGS. 1 through 4, the power unit 70 comprises a standard, internal combustion engine motor 72 having a rearwardly extending propeller 74 rotated thereby. Reference numeral 76 indicates an optional protective cage or shroud in which propeller 74 may rotate. Many commercially available engine-propeller systems may be utilized with the present invention, such as a 12-hp McCulloch MC-101, which weighs thirty pounds and provides around 60 pounds' thrust at 6500 to 8000 rpm. An alternate engine may be, for example, a 150-cc, 13 pound power plant manufactured by Chrysler/West Bend. Other suitable engines will suggest themselves to a person of ordinary skill in the art.

The engine 72 is supported by an upper motor support frame 78 which comprises a pair of tubular arms 80 and 82 which are connected at their rearward portion 83 for supporting the engine 72 and which extend outwardly and downwardly. The ends of arms 80 and 82 are pivotally mounted as at 84 to the outer extremities of the seat assembly just behind the handlebars 132 and 136. The forward extremities of arms 80 and 82 preferably terminate in a pair of bushings within which are mounted pivot bolts to secure same to sturdy receiving brackets located beneath said outer extremities. The reason for the pivotal connection of arms 80 and 82 will become more clear hereinafter.

The frame structure for the engine 72 also includes a lower motor support frame 86 which preferably consists of a single tubular member which extends from the under side of motor 72 downwardly and forwardly. The lower motor support frame 82 preferably terminates in an adjustable yoke assembly (see FIGS. 7 and 8) which comprises a pair of brackets 92 and 93 each having apertures 180 formed therein. A pivot pin 94 is placed through selected aligned apertures 180 in brackets 92, 93 for securing the frame member 86 to bracket 36 of chassis 20. As different apertures 180 are selected, the upper frame 78 pivots about points 84. As a result, the angle of thrust imparted by engine 72 and its propeller 74 may be varied as may be desired for a particular environment. This capability is highly desirable in attaining the most satisfactory response from the present invention during the negotiation of a particular type of surface, and may be changed for hard packed snow, powdered snow, ice, water, artificial surfaces, irregular surfaces, or smooth terrain.

A pair of reinforcing braces 98 and 100 extend diagonally between the lower motor support frame 86 and the upper motor frame 78. The engine 72 is itself encased and supported by motor block mounting plates 102, 104, 106 and 108. The mounting plates 102 through 108 are preferably formed of a lightweight metal, and may be either welded or bolted to the motor support framework so as to permit the motor 72 to be adequately supported thereby.

A lightweight, preferably tubular, crash or roll-bar assembly is indicated generally by reference numeral 110 and is attached to and extends from the lower motor support frame 86. The roll-bar assembly 110 includes a pair of side bars 112 and 114 which are connected at their top ends by connecting bar 115. From bar 115, side bars 112 and 114 extend downwardly and outwardly to the outer extremities of tubular arms 80 and 82 of the upper motor frame support 78, and may be secured thereto as by welding at points 124 and 126. From points 124 and 126, the side bars 112 and 114 extend downwardly and inwardly to their point of connection to the tubular lower motor support frame 86. Lightweight brace supports 120 and 122 may be connected between a transverse connecting bar 116 and the upper motor support frame 78. Bar 116 extends between side bars 112 and 114. Positioned above connecting bar 116 and below bar 115 may be a headrest which is preferably adjustable upwardly or downwardly to a accommodate the individual height of the operator. The headrest would be preferably concave and constructed of a lightweight synthetic or natural material, and may be either padded or unpadded.

Positioned below the headrest 118 is a back support band 142 which is connected to the side bars 112 and 114. The back support band 142 may be constructed of lightweight canvas, mesh, or any other pliable sturdy material, either synthetic or natural, for supporting the back of the operator. A waist seatbelt 128 may extend from the side bars 112 and 114, while a legbelt 130 may be provided from seat 66. The purpose of the roll-bar assembly 110 is to provide added support for the operator and to increase safety by further separating the operator from the rearwardly mounted engine assembly 70.

Adjacent the forward lateral extremities of seat 66 are a pair of handles 132 and 136, one of which may be provided with a wrist strap 134. Handle 136 preferably comprises a throttle control for regulating the speed of the engine 72, in a fashion analogous to that well-known for regulating motorcycles and motorbikes. Extending from one end of the other handle 132 is preferably an emergency shut-off ignition switch 138 which, in the embodiment illustrated, is thumb-operated. The preferred operation is such that when switch 138 is released by the thumb, the motor 72 is immediately cut-off. The emergency shut-off switch 138 may, alternatively, be built into a braking system, which may include a brake lever 140 mounted to handle 132. Brake lever 140 cooperates with other components to be described in greater detail hereinafter.

As illustrated in FIGS. 3, 5 and 9, the forward portion of the ski device 10 of the present invention may be provided with a wind or snow shield 144 for shielding the driver/operator against wind or snow. The windshield 144 may be made of any suitable lightweight material such as plexiglass. As seen in FIG. 9, the windshield 144 may be V-shaped and consists of a pair of planar portions 158 and 160 which are respectively connected by a pair of brackets 162 and 164 that extend from and are fastened to the forward portion of chassis 20.

As illustrated in FIGS. 4 and 10, the ski device 10 of the present invention may be provided with a pair of small, elongated pontoons 146 and 148 for water use. The pontoons 146 and 148 may be secured by suitable support braces 150 and 152 to the outer extremities of the seat assembly, beneath and slightly behind the handlebars 132 and 136. The pontoons 146 and 148 are of a displacement sufficient to provide buoyancy for sustaining the ski device 10 above water while initiating forward thrust. The pontoons are also sufficient to provide flotation of the entire unit in the event of accidental power failure.

FIG. 6 illustrates an alternate mounting of the shock absorbers 46 and 44 from that illustrated in FIGS. 1 through 4. In FIG. 6, the shock absorbers 46 and 44 are connected by bracket pairs 154 and pivot pins 156 to the underside of the seat assembly, rather than to the chassis portion 27 as in FIG. 4. The configuration of FIG. 6 is particularly suitable for those applications or conditions where a greater up and down travel clearance of the lower motor support frame is desired, such as with a very heavy person as the operator, or while negotiating particularly rough terrain.

Referring now to FIG. 5, an alternate embodiment of the ski device 10 of the present invention as illustrated and is seen to include a motor or engine 72 which is inboard of the chassis 20 by being supported on a motor mount 166 connected to the underside of chassis 20. The motor 72 includes an output shaft 168 which extends rearwardly through a cylindrical support 174 and terminates in propeller 74. The support 174 may comprise an elongated ball, roller or bushing bearing for supporting the outer extremity of the drive shaft 168. Housing 174 is, in turn, supported by mounting plates 176 and 178 which may, in turn, be supported by the same type of framework as described above in connection with FIGS. 1 and 2.

In order to provide the same angular thrust adjustment capability, at least one and preferably two universal joints 170 and 172 are connected to the propeller drive shaft 168. As illustrated in FIG. 5, two such universal joints are provided, joint 170 being positioned adjacent the rear end of the engine 72, while joint 172 is positioned near the shaft bearing 174 of shaft 168. If only a single universal joint were desirable, it would preferably be positioned more towards the motor 72. The bushing supported propeller shaft includes sufficient longitudinal travel clearance to allow for any drive shaft length variance vis a vis the upper and lower motor support frames 82 and 86 which may result from a change in the angle of thrust effected by points 84 and 94.

One embodiment of a braking system which may be utilized with any of the models of the present invention is shown in FIG. 5 and includes a brake claw 182 which basically consists of an L-shaped lightweight piece of rigid metal which is pivotally mounted as at 186 to a spring loaded hinge 184. A brake cable 188 is attached to the upper face of claw 182 and extends through a series of rollers 190, 192 and 194, and terminates at the emergency brake handle 140 (see FIG. 1). Roller 190 is positioned adjacent hinge 184, roller 192 is positioned adjacent and may be integral with bracket 29, while roller 194 may be connected to chassis 20 at any suitable location. The spring 185 biases the claw 182 downwardly so that it normally extends below the rear edge 16 of runner 12 to engage the surface over which the runner 12 is positioned. During operation, a user would grasp handle 140 to draw cable 188 and thereby oppose the bias of spring 185, thereby disengaging the brake. To actuate the brake, the user releases handle 140, and spring 185 biases claw 182 downwardly to engage the surface over which the runner 12 is moving.

FIGS. 11 and 12 illustrate another optional accessory which may be utilized with the powered ski of the present invention. A pair of small outrigger skis 196 may be preferably provided, one under each outer extremity of the seat 66, for use on either snow or ice. The outrigger skis 196 would provide clearance beneath the handles, thereby serving to protect the hand as well as the motor and propeller from contact with the ground which may result from tilting the unit to the extreme right or left. The outriggers 196 would also serve the function of parking braces when the unit is not in use.

If the device 10 of the present invention is used on an icy surface, such as a frozen lake, outrigger skis 196, as well as runner 12, would be specially designed for ice and would have, for example, a running surface or base preferably constructed of a hard and high tempered steel suited for such a hard surface.

Alternatively, the outriggers 196 could be in the form of an ice skate runner. The outriggers 196 are supported by suitable struts 198.

Referring now to FIG. 14, an alternate embodiment of the present invention includes a different mode of propulsion in the form of a small jet engine 200 which is mounted inboard by being connected to the chassis 20. The chassis 20 would include a jet engine intake scoop positioned either on the top edge 28 as at 202, on the front edge 24 as at 204. In either event, an air intake conduit 206 would communicate the air from scoops 202 and/or 204 to the intake conduit of jet engine 200. Reference numeral 208 indicates the exhaust conduit for the small jet engine 200. Other types of forward thrust power units could be utilized with the ski device 10 of the present invention, such as, for example, a jet pump drive, turbo drive, or the like.

Referring now to FIG. 13, an alternate embodiment of the jet engine drive of the present invention is illustrated and is seen to include a pair of smaller jet engines 210 and 212 which are mounted one on each side of the upright chassis 20 beneath the seat 66. A pair of supports 214 and 216 extend laterally from the upright chassis 20.

FIG. 15 indicates a rear-mounted propellerless jet engine 218 which is supported by the upper and lower frame members 78 and 86 so that the thrust thereof is angularly adjustable via pivot 84 and bracket 92. Jet engine 218 includes an intake port 220 and an exhaust port 221, and is supported by a mount 222.

Figure 17:
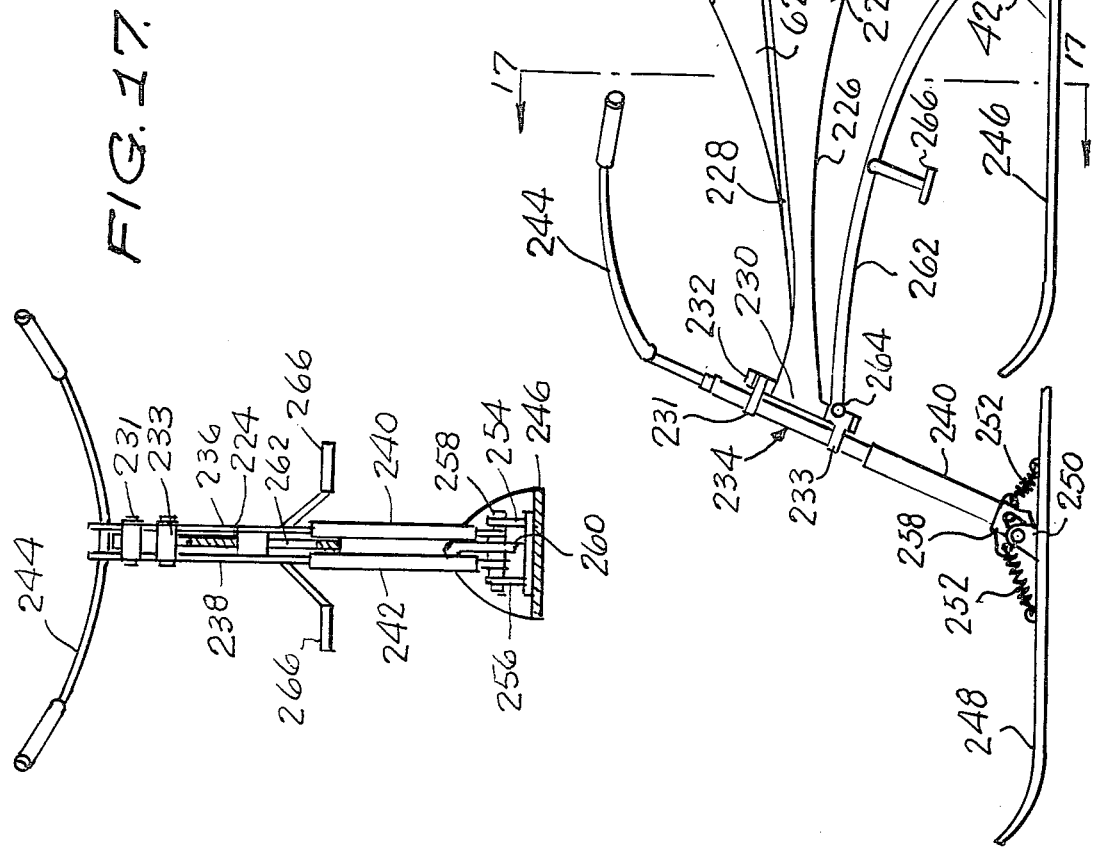
FIG. 17 is a sectional view of FIG. 16 taken along line 17—17 thereof.

Referring now to FIGS. 16 and 17, there is illustrated yet another alternate embodiment of the present invention which comprises a steerable powered ski. For the sake of ease in explanation, the power unit 70 of FIG. 16 is illustrated as being identical to that illustrated above with respect to FIG. 2. The upright chassis 224 of this embodiment includes a lower edge 226 which is somewhat more elongated and horizontally disposed than the prior design. The anti-sway linkages 38 and 40, shock absorber 46, seat 66 and fenders 62 are the same as in the earlier embodiment.

The upper edge 228 of chassis 224 curves to form at the forward end thereof a pivot bushing 230 for receiving a pivot pin 232 for supporting upper and lower brackets 231 and 233, respectively. A steering column indicated generally by reference numeral 234 extends through brackets 231 and 233 and is preferably of a twin-fork, twin-shock absorber style, as illustrated in FIG. 17.

Twin-forks 236 and 238 also serve as pistons for built-in shock absorbers 240 and 242. A handlebar 244 extends through the upper portions of forks 236 and 238, the handles of which may contain the various controls described above in connection with FIGS. 1 through 4.

The main ski 246 is somewhat shorter than the runner 12 of the earlier embodiments to provide room for a forwardly mounted steering ski 248. Steering ski 248 is pivotally coupled to the lower ends of shock absorbers 240 and 242 by means of brackets 250 and springs 252. Brackets 250 include a pair of upstanding flanges 254 and 256 through which a pivot shaft 258 extends. A mounting plate 260 forms a base for the bracket 250.

An anti-sway, pitch control stabilizer bar 262, which may be either a single or multiple tubular member, is connected between a forward pivot 264 on bracket 233 and bracket 42. Pivot pin 48, which serves as the connection point for the lower arm 40 of the anti-sway linkage, also serves as the connection point for the stabilizer bar 262. A pair of foot pads 266 may be integrally mounted to the stabilizer bar 262 as an alternate to the outrigger skis 68 of FIG. 1.

The powered ski device of FIGS. 16 and 17 is utilized in much the same manner as a motorbike or motorcycle. Some pressure is directed to the front steering ski 248 while leaning and turning into the direction of turn desired. In lieu of foot pads 266, outriggers 68 could be utilized on each foot, if desired. Further, in lieu of the propeller-driven power unit 70, the jet engine type of power unit discussed above in connection with FIGS. 13 through 15 could also be utilized.

Obviously, numerous modifications and variations of the present invention are possible in light of the above teachings. For example, as an alternative embodiment to pivoting the entire motor support framework in order to change or vary the angle of thrust, means may be provided such that only the motor itself need be pivoted to effectuate a thrust angle variation. It is therefore to be understood that within the scope of the appended claims, the invention may be practiced otherwise than as specifically described herein.

I claim as my invention:

1. A ski device, which comprises:
   elongated runner means;
   seating means pivotally mounted at its forward end to said runner means;
   anti-sway means pivotally mounted between said seating means and said runner means;
   shock-absorbing means pivotally mounted between and extending downwardly and forwardly from the rear portion of said seating means to said runner, wherein the distance between the pivotal mount of said forward end of said seating means to said runner and the pivotal mount of said shock-absorbing means to said runner is approximately the same as the distance between the front and rear bindings of a regular, foot-mounted ski; and
   power-operated means connected to said seating means for propelling said device forwardly.

2. A ski device as set forth in claim 1, wherein said seating means comprises a vertically oriented chassis and a seat mounted to the top of the rear portion thereof.

3. A ski device as set forth in claim 2, further comprising frame means connected between said chassis and said power-operated means for supporting the latter.

4. A ski device as set forth in claim 3, wherein said frame means includes means for adjusting the angle of thrust imparted by said power-operated means by changing the angle of inclination of the latter with respect to the horizontal.

5. A ski device, which comprises:
   elongated runner means;
   seating means pivotally mounted at its forward end to said runner means;
   anti-sway means pivotally mounted between said seating means and said runner means;
   shock-absorbing means pivotally mounted between and extending downwardly and forwardly from the rear portion of said seating means to said runner;
   power-operated means connected to said seating means for propelling said device forwardly;
   wherein said seating means comprises a vertically oriented chassis and a seat mounted to the top of the rear portion thereof;
   frame means connected between said chassis and said power-operated means for supporting the latter;
   wherein said frame means includes means for adjusting the angle of thrust imparted by said power-operated means by changing the angle of inclination of the latter with respect to the horizontal; and
   wherein said frame means comprises an upper frame member including two tubular arms each pivotally connected at their forward ends to said chassis, and a lower tubular frame member which terminates in means for adjustably connecting same to said chassis.

6. A ski device as set forth in claim 5, wherein said means for adjustably connecting said lower frame member to said chassis comprises a yoke assembly extending from the end of said lower tubular frame member including a pair of parallel bracket members having apertures formed along the length thereof for selective attachment to said chassis.

7. A ski device as set forth in claim 5, wherein said upper and lower frame members extend rearwardly from said chassis and terminate in a motor mount assembly for supporting said power-operated means.

8. A ski device as set forth in claim 7, wherein said power operated means comprises a motor driven propellor.

9. A ski device as set forth in claim 5, wherein said power-operated means comprises a propellor, and further comprising a motor mounted in said chassis and having a drive shaft extending rearwardly from said motor to said propellor.

10. A ski device as set forth in claim 5, wherein said power-operated means comprises a propellor, and further comprising a motor mounted in said chassis and having a drive shaft extending rearwardly from said motor to said propellor.

11. A ski device as set forth in claim 10, wherein said upper and lower frame members extend rearwardly from said chassis and terminate in a propellor mount assembly for supporting said propellor.

12. A ski device as set forth in claim 11, wherein said propellor mount assembly comprises a cylindrical housing having bearings on the inside thereof through which said drive shaft extends, and a mounting plate connected to said lower frame member for supporting said housing.

13. A ski device as set forth in claim 12, further comprising at least one universal joint to which said shaft is connected adjacent said motor for permitting said angular adjustment of thrust.

14. A ski device as set forth in claim 2, further comprising a pair of handle means positioned one on each side of said seat.

15. A ski device as set forth in claim 14, wherein one of said handle means includes throttle means for controlling the speed of said power-operated means.

16. A ski device as set forth in claim 14, wherein one of said handle means includes means for actuating means for braking said device.

17. A ski device as set forth in claim 16, wherein said braking means comprises a brake claw mounted to the rear end of said runner means, and cable means for connecting said brake claw to said means for actuating same on said one of said handle means.

18. A ski device as set forth in claim 17, wherein said brake claw comprises an L-shaped member pivotally mounted to said rear end and including spring means for normally biasing same downwardly into engagement with the surface over which said runner means is positioned.

19. A ski device as set forth in claim 18, wherein said means for actuating said L-shaped member comprises a lever which, when grasped by a user, acts to oppose the bias of said spring means by drawing said brake claw out of engagement with said surface.

20. A ski device as set forth in claim 14, further comprising switch means positioned in one of said handle means for automatically cutting off said power-operated means.

21. A ski device as set forth in claim 2, further comprising a windshield attached to the forward portion of said chassis.

22. A ski device as set forth in claim 5, further comprising a roll-bar assembly connected to and extending upwardly from said frame means.

23. A ski device as set forth in claim 22, wherein said roll-bar assembly includes a pair of vertical support arms connected by a cross-bar at the top ends thereof and extending downwardly and outwardly to each of said tubular arms and then inwardly and downwardly to said lower frame member.

24. A ski device as set forth in claim 23, further comprising an adjustable head rest positioned between the upper portions of said pair of vertical support arms.

25. A ski device as set forth in claim 24, further comprising a back rest mounted between said vertical support arms below said head rest.

26. A ski device, which comprises:
elongated runner means;
seating means pivotally mounted at its forward end to said runner means;
anti-sway means pivotally mounted between said seating means and said runner means;
shock-absorbing means pivotally mounted between and extending downwardly and forwardly from the rear portion of said seating means to said runner;
power-operated means connected to said seating means for propelling said device forwardly;
wherein said seating means comprises a vertically oriented chassis and a seat mounted to the top of the rear portion thereof;
further comprising a pair of handle means positioned one on each side of said seat; and
further comprising a pair of pontoons connected respectively so as to extend downwardly from said pair of handle means.

27. A ski device, which comprises:
elongated runner means;
seating means pivotally mounted at its forward end to said runner means;
anti-sway means pivotally mounted between said seating means and said runner means;
shock-absorbing means pivotally mounted between and extending downwardly and forwardly from the rear portion of said seating means to said runner;
power-operated means connected to said seating means for propelling said device forwardly;
wherein said seating means comprises a vertically oriented chassis and a seat mounted to the top of the rear portion thereof;
further comprising a pair of handle means positioned one on each side of said seat; and
further comprising a pair of outrigger skis connected respectively so as to extend downwardly from said pair of handle means.

28. A ski device as set forth in claim 2, wherein said power-operated means is mounted within said chassis.

29. A ski device as set forth in claim 28, wherein said power operated means comprises at least one jet engine, and further comprising intake port means positioned in the forward portion of said chassis and conduit means for directing air from said intake port means to said jet engine.

30. A ski device as set forth in claim 28, wherein said power-operated means comprises motor means for driving a rearwardly positioned propellor.

31. A ski device as set forth in claim 2, wherein said runner means comprises a single ski pivotally connected to said chassis at said forward and rear ends thereof.

32. A ski device as set forth in claim 1, wherein said runner means comprises a main ski connected to said chassis via said anti-sway means, and a steering ski positioned forwardly of said main ski and connected to said chassis at the forward end thereof.

33. A ski device as set forth in claim 32, further comprising means for turning said steering ski coupled to said forward end of said chassis.

34. A ski device as set forth in claim 33, wherein said turning means comprises a steering column pivotally coupled to the forward end of said chassis, shock absorber means coupled to said steering column, and means for pivotally coupling the lower end of said shock absorber means to said steering ski.

35. A ski device as set forth in claim 34, further comprising a handle bar connected to said steering column so as to rotate same upon actuation by a rider.

36. A ski device as set forth in claim 35, wherein said shock absorber means includes dual shock absorbers.

37. A ski device as set forth in claim 34, wherein said forward end of said chassis includes a pivot bushing and pivot pin for effecting a pivotal connection to said steering column.

38. A ski device as set forth in claim 37, further comprising stabilizer means connected between said pivot bushing and said anti-sway means.

39. A ski device as set forth in claim 38, wherein said stabilizer means comprises a curved stabilizer bar pivotally coupled both to said pivot bushing and a pivotal connection between said anti-sway means and said main ski.

40. A ski device as set forth in claim 38, wherein said stabilizer means includes foot rest means connected thereto.

41. A ski device, which comprises:
 elongated runner means;
 seating means pivotally mounted at its forward end to said runner means;
 anti-sway means pivotally mounted between said seating means and said runner means;
 shock-absorbing means pivotally mounted between and extending downwardly and forwardly from the rear portion of said seating means to said runner;
 power-operated means connected to said seating means for propelling said device forwardly;
 wherein said seating means comprises a vertically oriented chassis and a seat mounted to the top of the rear portion thereof;
 further comprising frame means connected between said chassis and said power-operated means for supporting the latter; and
 wherein said frame means includes means for adjusting the angle of thrust imparted by said power-operated means by changing the angle of inclination of the latter with respect to the horizontal.

42. A ski device as set forth in claim 41, wherein said power-operated means comprises a propellor, and further comprising a motor mounted in said chassis and having a drive shaft extending rearwardly from said motor to said propellor.

43. A ski device as set forth in claim 41, wherein said power-operated means comprises at least one jet engine.

44. A ski device as set forth in claim 41, wherein said power-operated means comprises motor means for driving a rearwardly positioned propellor.

* * * * *